(12) United States Patent
Easter

(10) Patent No.: US 8,287,770 B2
(45) Date of Patent: Oct. 16, 2012

(54) SEMICONDUCTING COMPOSITION

(75) Inventor: Mark R. Easter, Indianapolis, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 327 days.

(21) Appl. No.: 12/718,649

(22) Filed: Mar. 5, 2010

(65) Prior Publication Data

US 2011/0215278 A1  Sep. 8, 2011

(51) Int. Cl.
*H01B 1/24* (2006.01)
*H01B 7/00* (2006.01)

(52) U.S. Cl. .................. 252/511; 174/120 SC

(58) Field of Classification Search ....... 252/500–521.6; 174/120 SC
See application file for complete search history.

(56) References Cited

U.S. PATENT DOCUMENTS

| | | |
|---|---|---|
| 3,182,101 A | 5/1965 | Rees et al. |
| 3,849,333 A | 11/1974 | Lloyd et al. |
| 4,102,855 A | 7/1978 | Kuan et al. |
| 4,150,193 A | 4/1979 | Burns, Jr. |
| 4,226,823 A | 10/1980 | Jansson et al. |
| 4,246,023 A | 1/1981 | Savov et al. |
| 4,246,142 A | 1/1981 | Ongchin |
| 4,286,023 A | 8/1981 | Ongchin |
| 4,305,849 A | 12/1981 | Kawasaki et al. |
| 4,412,938 A | 11/1983 | Kakizaki et al. |
| 4,493,787 A | 1/1985 | Taniguchi et al. |
| 4,612,139 A * | 9/1986 | Kawasaki et al. ............. 252/511 |
| 4,648,986 A | 3/1987 | Kotani et al. |
| 4,812,505 A * | 3/1989 | Topcik ......................... 524/377 |
| 4,857,232 A | 8/1989 | Burns, Jr. |
| 4,933,107 A | 6/1990 | Watanabe et al. |
| 4,993,107 A | 2/1991 | Zoni |
| 5,556,697 A | 9/1996 | Flenniken |
| 5,889,117 A | 3/1999 | Flenniken |
| 6,013,202 A | 1/2000 | Easter et al. |
| 6,086,792 A | 7/2000 | Reid et al. |
| 6,124,395 A | 9/2000 | Flenniken et al. |
| 6,133,367 A | 10/2000 | Arhart |
| 6,274,066 B1 | 8/2001 | Easter |
| 6,294,256 B1 | 9/2001 | Easter |
| 6,299,978 B1 * | 10/2001 | Sarma ......................... 428/379 |
| 6,402,993 B1 | 6/2002 | Easter |
| 6,491,849 B1 * | 12/2002 | Easter ......................... 252/511 |
| 6,592,791 B1 | 7/2003 | Easter |
| 2002/0042464 A1 | 4/2002 | Barclay et al. |
| 2006/0246286 A1 | 11/2006 | Easter |

FOREIGN PATENT DOCUMENTS

| | | |
|---|---|---|
| EP | 0210425 A2 | 2/1987 |
| EP | 0334992 A1 | 10/1989 |
| EP | 0420271 A1 | 4/1991 |
| JP | 60260637 A | 12/1985 |
| WO | 9821278 A1 | 5/1998 |

* cited by examiner

*Primary Examiner* — Mark Kopec
*Assistant Examiner* — Jaison Thomas
(74) *Attorney, Agent, or Firm* — Blank Rome LLP

(57) ABSTRACT

An improved conductor shielding composition for power cables is disclosed. The composition includes a base polymer, conductive carbon black, polyethylene glycol and a waxy additive. Cable shields prepared from the composition exhibit improved aging performance in accelerated cable life tests (ACLT).

8 Claims, No Drawings

SEMICONDUCTING COMPOSITION

REFERENCE TO RELATED APPLICATIONS

This application is related to U.S. Ser. No. 09/765,297, by the same inventor, which was filed on Jan. 22, 2001 and issued as U.S. Pat. No. 6,491,849 on Dec. 10, 2002, and U.S. Ser. No. 09/685,574 by the same inventor, which was filed on Oct. 11, 2000 and issued as U.S. Pat. No. 6,274,066 on Aug. 14, 2001.

BACKGROUND OF THE INVENTION

1. Technical Field of the Invention

This invention relates to compositions useful in the preparation of semiconductive conductor shields in power cables and to semiconductive conductor shields and power cables utilizing the composition.

2. Description of the Related Art

A typical insulated electric power cable generally comprises a conductor in a cable core that is surrounded by several layers of polymeric materials including an inner semiconducting shield layer (conductor or strand shield), an insulating layer, an outer semiconducting shield layer (insulation shield), a metallic wire or tape shield used as the ground phase, and a protective jacket. Additional layers within this construction such as moisture impervious materials, are often incorporated. The invention pertains to the inner semiconducting shield layer, i.e., the conductor shield.

Semiconductive shields have been used in power cables as shields for the cable conductor and insulation for many years. The conductor shield is typically extruded over the cable conductor to provide a layer of intermediate conductivity between the conductor and cable insulation in the power cable. Conventional compositions for these conductor shields include a base polymer as the predominant component of the composition compounded with, carbon black to provide conductivity for the composition and various additives.

The primary purpose of the semiconducting conductor shield between the conductor and insulation in an electrical power cable is to ensure the long term viability of the primary insulation. There is always a need for improved semiconductive conductor shield compositions that balance cost and performance.

Examples of polymer compositions used as shields in power cables are found in the disclosures of U.S. Pat. Nos. 4,612,139 and 4,305,849 to Kawasaki et al., U.S. Pat. No. 4,857,232 to Burns, Jr., U.S. Pat. No. 3,849,333 to Lloyd et al., U.S. Pat. No. 5,889,117 to Flenniken, and U.S. Pat. No. 6,086,792 to Reid et al., the disclosures of which are hereby incorporated by reference.

U.S. Pat. No. 6,491,849 to Easter, the disclosure of which is hereby incorporated by reference, describes a semiconducting composition containing EVA wax, but not containing polyethylene glycol.

It would be desirable to have a conductor shield material with improved performance that does not require the use of expensive additives, complex polymer formulations, or specially prepared carbon black, as performance must always be balanced with cost in the manufacture of electric cable.

SUMMARY OF THE INVENTION

The invention provides a conductor shield material with improved performance without the need for expensive additives, complex polymer formulations, or specially prepared carbon black.

In particular, the composition of the invention, conductor shields and cables made with conductor shields in accordance with the invention exhibit superior performance over time as demonstrated by accelerated cable life testing (ACLT) as compared to conventional high performance conductor shield compositions.

In particular, the invention provides a conductor shield comprising a base polymer selected from the group consisting of copolymers of ethylene and a mono-unsaturated ester, copolymers of ethylene and one or more alpha olefins having three to six carbon atoms, EPR and EDPM rubbers, low density polyethylene and linear low density polyethylene; conductive carbon black; a polyethylene glycol; and a waxy additive selected from the group consisting of at least one amide wax, at least one ethylene vinyl acetate wax and mixtures of at least one amide wax and at least one ethylene vinyl acetate wax.

The invention also provides a conductor shield consisting essentially of a base polymer selected from the group consisting of copolymers of ethylene and a mono-unsaturated ester, copolymers of ethylene and one or more alpha olefins having three to six carbon atoms, EPR and EDPM rubbers, low density polyethylene and linear low density polyethylene; conductive carbon black; a polyethylene glycol; and a waxy additive selected from the group consisting of at least one amide wax, at least one ethylene vinyl acetate wax and mixtures of at least one amide wax and at least one ethylene vinyl acetate wax.

In addition to the composition matter, the invention includes a semiconductive shield for the conductor or insulation in a power cable formed by extruding the composition over the conductor or insulation of the power cable and the resulting power cable that employs the composition as a conductor shield.

DETAILED DESCRIPTION OF THE INVENTION

The base polymer of the composition of the invention can be selected from a variety of polymers including various homopolymers, copolymers and terpolymers known in the art, the selection being based upon the ultimate desired use of the polymer composition. For example, the polymers used in the polymeric compositions of the present invention may include, but are not limited to, homopolymers, copolymers and graft polymers of ethylene where the co-monomers are selected from butene, hexene, vinyl acetate, acrylic acid, methacrylic acid, esters of acrylic acid, esters of methacrylic acid, maleic anhydride, half esters of maleic anhydride, carbon monoxide and the like; elastomers selected from natural rubber, polybutadiene, polyisoprene, random styrene butadiene rubber, polychloroprene, nitrile rubbers, ethylene propylene copolymers and terpolymers and the like; homopolymers and copolymers of styrene, including styrene-butadiene, styrene-butadiene-styrene linear and radial polymers, acrylonitrile-butadiene-styrene, styrene acrylonitrile and the like; linear and branched polyether or polyester polyols; crystalline and amorphous polyesters and polyamides; alkyd resins, rosin acids or rosin esters; hydrocarbon resins produced from thermal or Friedal Crafts polymerization of cyclic diene monomers such as dicyclopentadiene, indene, cumene and the like; ethylene/silane copolymers; ethylene/.alpha.-olefin/diene terpolymers such as ethylene/propylene/1,4-hexadiene, ethylene/1-butene/1,4-hexadiene and the like; mixtures thereof and the like. Additionally, the polymer used in compositions of the present invention may include copolymers and terpolymers containing the above-identified polymers as major components of the copolymer or terpolymer.

Preferably, the base polymer of the composition of the invention is selected from a variety of polymers including copolymers of ethylene and a mono-unsaturated ester such as ethylene-ethyl acrylate, ethylene-methyl acrylate, ethylene-methyl methacrylate and ethylene-vinyl acetate, copolymers of ethylene and one or more alpha olefins having three to six carbon atoms, as well as EPR and EDPM rubbers, low density polyethylene (LDPE) and linear low density polyethylene (LLDPE). Of these copolymers, ethylene-vinyl acetate (EVA) is more preferred. More particularly, EVA having a vinyl acetate content between 18 and 20% is most preferred for use as the base polymer of the invention. The base polymer of the composition of the invention is present in amounts from about 30% to about 99.4% by weight, based upon the weight of the of the total composition.

In the present invention, commercially available, conventional carbon black is added to the polymer compositions to impart semi-conductive properties to the composition. The ability to use such commercially available, conventional carbon blacks to achieve improved ACLT results is an advantage of the invention. The carbon black added to the polymer may be one of the various available conventional carbon blacks, including finely divided carbon such as lamp black, furnace black, or acetylene black, i.e. carbon black made by pyrolyzing acetylene. Ketjin black may be used in the compositions of the invention as well as many of the commercial carbon black grades described in ASTM D 1765 98b, for example, N351, N293 and N550. Preferably, to avoid problems associated with carbon black dust, the carbon black is pelletized, although non-pelletized carbon black, such as in its fluffy form, may also be used with equal success. The carbon black is generally present in the composition in the amount of from about 0.1% to about 65% by weight of the polymer composition. Preferably the carbon black is present in an amount of from about 10% to about 50% by weight, based on the weight of the total composition.

A tremendous number of compounds have been suggested for use as additives in semiconducting shield compositions. Typically, these compounds fall into the category of antioxidants, curing agents, vulcanizing agents, crosslinking agents, boosters and retardants, processing aids, pigments, dyes, colorants, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators.

The present invention is based upon the discovery that the combination of certain polar waxes with polyethylene glycol (PEG) produce a shield composition having enhanced electrical aging performance as measured by accelerated cable life testing (ACLT). The polar waxes of the invention, i.e., the waxy additive, are selected from the group consisting of amide wax, ethylene vinyl acetate wax or waxes of copolymers of ethylene and a mono-unsaturated ester such as ethylene-ethyl acrylate, ethylene-methyl acrylate, ethylene-methyl methacrylate and ethylene-vinyl acetate, copolymers of ethylene and one or more alpha olefins having three to six carbon atoms and mixtures of these waxes In preferred embodiments of the invention, the waxy additive is an ethylene vinyl acetate (EVA) wax and has a molecular weight from about 5,000 Daltons to about 40,000 Daltons and a vinyl acetate content of from about 2% to about 28%, preferably from about 10% to about 20%. In more preferred embodiments, the EVA wax has a molecular weight from about 5,000 Daltons to about 30,000 Daltons and a vinyl acetate content of from about 8% to about 15%. The waxy additive may be at least one amide wax, at least one EVA wax, or a mixture of at least one amide wax and at least one EVA wax. The waxy additive is from about 0.5% to about 5.0% by weight of the composition, preferably from about 0.8% to about 2.0% by weight of the composition.

The polyethylene glycol (PEG) of the invention may be a PEG having a molecular mass of about 300 g/mol to about 35,000 g/mol and may be polydisperse or monodisperse. It can also be a block copolymer with polypropylene glycol. Examples of PEGs suitable for use with the present invention include those sold under the brand name CARBOWAX by Dow Chemical (Midland, Mich.). In certain embodiments, the PEG is a solid with a molecular mass of 5,000 to 20,0000 g/mol.

Examples of antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline (TMQ), n,n'-bis(1,4-dimethylpentyl-p-phenylenediamine), alkylated diphenylamines, 4,4'-bis(alpha, alpha-demthylbenzyl)diphenylamine, diphenyl-p-phenylenediamine, mixed di-aryl-p-phenylenediamines, and other hindered amine antidegradants or stabilizers. Antioxidants can be used in amounts of about 0.1 to about 5 percent by weight based on the weight of the composition.

Examples of curing/crosslinking agents are as follows: dicumyl peroxide; bis(alpha-t-butyl peroxyisopropyl)benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2,5-dimethylhexyne-3; 1,1-bis(t-butylperoxy)3,3,5-trimethylcyclohexane;
isopropylcumyl cumylperoxide; di(isopropylcumyl) peroxide; or mixtures thereof. Peroxide curing agents can be used in amounts of about 0.1 to 5 percent by weight based on the weight of the composition.

The polymer compositions of the present invention may be manufactured using conventional machinery and methods to produce the final polymer product. The compositions may be prepared by batch or continuous mixing processes such as those well known in the art. For example, equipment such as Banbury mixers, Buss cokneaders, and twin screw extruders may be used to mix the ingredients of the formulation. The components of the polymer compositions of the present invention may be mixed and formed into pellets for future use in manufacturing electrical cable.

The composition of the invention, and conductor shields and cables made with conductor shields in accordance with the invention exhibit superior performance over time as demonstrated by accelerated cable life testing (ACLT) as compared to conventional high performance conductor shield compositions. Specifically, as described below in the Example, the composition of the invention when used in a conductor shield has an accelerated cable life testing Weibull Beta value of 1.5 or more, preferably 3.0 or more. While the connection between smoothness of the conductor shield may or may not be related to the improved ACLT values, nonetheless, the composition of the invention when used in a conductor shield may achieve a count of surface imperfections/m² of 500 or less, preferably a count of surface imperfections/m² of 200 or less.

To further illustrate the advantageous features of the invention, the following non-limiting examples are provided.

EXAMPLES

Example 1

Accelerating Cable Life Test (ACLT)

Three power cables were prepared. The cables had a 1/0 19 wire stranded aluminum conductor surrounded by 15 mils. of a conductor shield having a composition as specified in Table 1 (representing the parts by weight), surrounded by 175 mils of cross-linked tree retardant polyethylene insulation (Dow 4201 and Dow 4202) containing PEG surrounded by 35 mils. of LS 567 semiconductive insulation shield (LS 567 is a product designation of General Cable). A Copper mesh was then wrapped around the insulation shield to provide the ground path for the shortout in the test. The conductor shield was extruded first and then the insulation and outer shield components were extruded over the conductor at one time on a Davis standard tandem extruder and dry cured under pressurized nitrogen in a continuous catenary vulcanization tube and water cooled. Table 1 provides the composition of the conductor shield in each of the three tested cables.

TABLE 1

Conductor shielding compositions tested and test results.

| | Inventive Example | Comparative Example 1 | Comparative Example 2 |
|---|---|---|---|
| EVA (18-20% VA) | 59 | 60 | 59 |
| Acetylene black | 38 | 38 | 38 |
| TMQ | 1 | 1 | 1 |
| EVA Wax | 1.5 | 0 | 2 |
| Dicumyl peroxide | 1 | 1 | 1 |
| PEG | 0.75 | 0.75 | 0 |
| Failure times in days | 1126 | 1241 | 679 |
| | 1112 | 842 | 679 |
| | 1188 | 1214 | 715 |
| | 1710 | 1342 | 785 |
| | On test 2000 days | 1379 | 1046 |
| | On test 2000 days | 1410 | 1337 |
| | On test 2000 days | 1468 | 1472 |
| Life in days (α) | 1882 (predicted) | 1382 | 1156 |

The EVA wax used had a MW of approximately 5,000 Daltons, an EVA content of 13%, and is sold by Honeywell Corporation of Morristown, N.J. under the designation AC400. The EVA base resin used is available from E. I. DuPont de Nemours of Wilmington, Del. under the designation ELVAX 450. The acetylene black used is available from Denka Denki Kagaku Kogyo of Tokyo, Japan under the designation Denka Granule. The TMQ used is available from RT Vanderbilt Company, Inc. of Norwalk, Conn. under the designation Agerite Resin D.

Five samples of the Comparative Example cable and cable made according to the invention were prepared for the test. Samples were preconditioned for 72 hours at 90° C. conductor temperature in free air. The center of each sample was immersed in 50° C. water. The cable conductor temperature in the water was controlled to 75° C. for 8 hours each 24 hour period. For the remaining 16 hours, the heating current was turned off. The samples were energized at four times normal voltage stress (34.6 kv) until all test samples failed.

The failure times were analyzed using extreme value distribution statistics (Weibull) to assess comparative mean life equivalency or enhancements versus control(s). For the Weibull distribution the distribution parameter is ETA (a) The scale parameter measures the relative scope or largeness of the variable in question. The cable utilizing the inventive composition has a greatly improved life.

What is claimed is:

1. A conductor shield composition comprising:
   a base polymer selected from the group consisting of copolymers of ethylene and a mono-unsaturated ester, copolymers of ethylene and one or more alpha olefins having three to six carbon atoms, EPR rubbers, low density polyethylene and linear low density polyethylene;
   conductive carbon black;
   polyethylene glycol; and
   about 0.5% to about 5.0% by weight of the composition of an ethylene vinyl acetate wax.

2. The composition of claim 1, wherein said ethylene vinyl acetate wax has a molecular weight from about 5,000 Daltons to about 40,000 Daltons and a vinyl acetate content of from about 2% to about 28%.

3. The composition of claim 2, wherein said at least one ethylene vinyl acetate wax has a vinyl acetate content of from about 8% to about 20%.

4. The composition of claim 2, Wherein said at least one ethylene vinyl acetate wax has a molecular weight from about 10,000 Daltons to about 25,000 Daltons and a vinyl acetate content of from about 12% to about 15%.

5. The composition of claim 1, wherein said base polymer is a copolymer of ethylene and vinyl acetate.

6. The composition of claim 5, wherein said base polymer has a vinyl acetate content between about 2% and about 28%.

7. The composition of claim 1, wherein the polyethylene glycol has a molecular weight of about 5000 to about 25,000 Daltons.

8. The composition of claim 1 having an accelerated cable life testing Weibull Alpha value of 1500 or more.

* * * * *